United States Patent
Kudo

(10) Patent No.: US 12,335,615 B2
(45) Date of Patent: Jun. 17, 2025

(54) CONTROL APPARATUS FOR DECIDING AN AREA TO PERFORM FOCUSING, IMAGE CAPTURING APPARATUS, CONTROL METHOD, AND MEMORY MEDIUM

(71) Applicant: CANON KABUSHIKI KAISHA, Tokyo (JP)

(72) Inventor: Keisuke Kudo, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 162 days.

(21) Appl. No.: 17/712,271

(22) Filed: Apr. 4, 2022

(65) Prior Publication Data
US 2022/0337756 A1 Oct. 20, 2022

(30) Foreign Application Priority Data
Apr. 15, 2021 (JP) ................. 2021-068951

(51) Int. Cl.
*H04N 23/67* (2023.01)
*G06V 10/22* (2022.01)
*G06V 40/10* (2022.01)

(52) U.S. Cl.
CPC ........... *H04N 23/675* (2023.01); *G06V 10/22* (2022.01); *G06V 40/10* (2022.01)

(58) Field of Classification Search
CPC ........ G06V 10/12; G06V 10/22; G06V 40/10; G06V 40/103; G06V 40/161; G06V 40/18; H04N 23/611; H04N 23/672; H04N 23/675
See application file for complete search history.

(56) References Cited

U.S. PATENT DOCUMENTS

| | | | | |
|---|---|---|---|---|
| 9,483,827 B2* | 11/2016 | Romanenko | ...... | G06F 18/24147 |
| 11,653,091 B2* | 5/2023 | Ishii | ...... | H04N 23/673 |
| | | | | 348/345 |
| 12,244,925 B2* | 3/2025 | Sakurabu | ...... | H04N 23/63 |
| 2019/0045133 A1* | 2/2019 | Tomosada | ...... | H04N 23/959 |
| 2021/0097354 A1* | 4/2021 | Amato | ...... | G06V 30/2504 |
| 2021/0258501 A1* | 8/2021 | Ikeda | ...... | H04N 23/675 |
| 2022/0337756 A1* | 10/2022 | Kudo | ...... | G06V 40/161 |

FOREIGN PATENT DOCUMENTS

JP 2019-121860 A 7/2019

* cited by examiner

*Primary Examiner* — Antoinette T Spinks
(74) *Attorney, Agent, or Firm* — Cowan, Liebowitz & Latman, P.C.

(57) ABSTRACT

A control apparatus includes at least one processor that functions as a setting a plurality of focusing points by using object information that includes information on a part of an object and is based on an image signal converted from an object image, a selection unit configured to select, from the plurality of focusing points in a search area, a main focusing point on which focusing is performed, an object determination unit configured to determine, by using a focusing state of a focusing point in a part with a highest priority in priorities set for respective parts of the object, whether or not the object included in the focusing point is the same as an object included in a previously selected main focusing point, and a decision unit configured to decide the search area based on a determination made by the object determination unit.

8 Claims, 11 Drawing Sheets

CONTROL APPARATUS FOR DECIDING AN AREA TO PERFORM FOCUSING, IMAGE CAPTURING APPARATUS, CONTROL METHOD, AND MEMORY MEDIUM

BACKGROUND OF THE INVENTION

Field of the Invention

The present disclosure relates to a control apparatus, an image capturing apparatus, a control method, and a memory medium.

Description of the Related Art

In recent years, a technique has been proposed that identifies and focuses on an area of a main object in various AF methods such as an image capturing plane phase difference AF method and a contrast AF method. Japanese Patent Laid-Open No. ("JP") 2019-121860 discloses a method of setting a focus detection area based on reliability of detected results of parts of a face.

However, in the method of JP 2019-121860, the focus detection area is set to a position of a main object, and therefore the focus detection may not be performed in an area suitable for the focus detection. Particularly, in a case where an object moves greatly, a desired result may not be acquired if the focus detection area includes an obstruction or a background on a far side or a close side of the object.

SUMMARY OF THE INVENTION

The present disclosure provides a control apparatus that can perform accurate focusing on an area with a higher priority while avoiding focusing on an area in which focus detection is difficult, even when an obstruction or a background are included in an object area on a far side or a close side of the object.

A control apparatus according to one aspect of embodiments of the disclosure includes at least one processor and at least one memory coupled to the at least one processor storing instructions that, when executed by the at least one processor, cause the at least one processor to function as a setting unit configured to set a plurality of focusing points by using object information that includes information on a part of an object and is based on an image signal converted from an object image, a selection unit configured to select, from the plurality of focusing points in a search area, a main focusing point on which focusing is performed, an object determination unit configured to determine, by using a focusing state of a focusing point in a part with a highest priority in priorities set for respective parts of the object, whether or not the object included in the focusing point is the same as an object included in a previously selected main focusing point, and a decision unit configured to decide the search area based on a determination made by the object determination unit.

An image capturing apparatus according to one aspect of embodiments of the disclosure includes an image sensor configured to convert an object image into an image signal and the control apparatus.

A control apparatus according to one aspect of embodiments of the disclosure includes at least one processor and at least one memory coupled to the at least one processor storing instructions that, when executed by the at least one processor, cause the at least one processor to function as a setting unit configured to set a plurality of focusing points by using object information that includes information on a part of an object and is based on an image signal converted from an object image, a selection unit configured to select, from the plurality of focusing points in a search area, a main focusing point on which focusing is performed, an obstruction determination unit configured to determine whether or not an obstruction exists in an area determined based on a priority set for each part of the object, and a decision unit configured to decide the search area based on a determination made by the obstruction determination unit.

An image capturing apparatus according to one aspect of embodiments of the disclosure includes an image sensor configured to convert an object image into an image signal and the control apparatus.

Control methods corresponding to the control apparatuses also constitute another aspect of the embodiments.

Further features of the present invention will become apparent from the following description of exemplary embodiments with reference to the attached drawings.

DESCRIPTION OF THE EMBODIMENTS

Figure 1A:
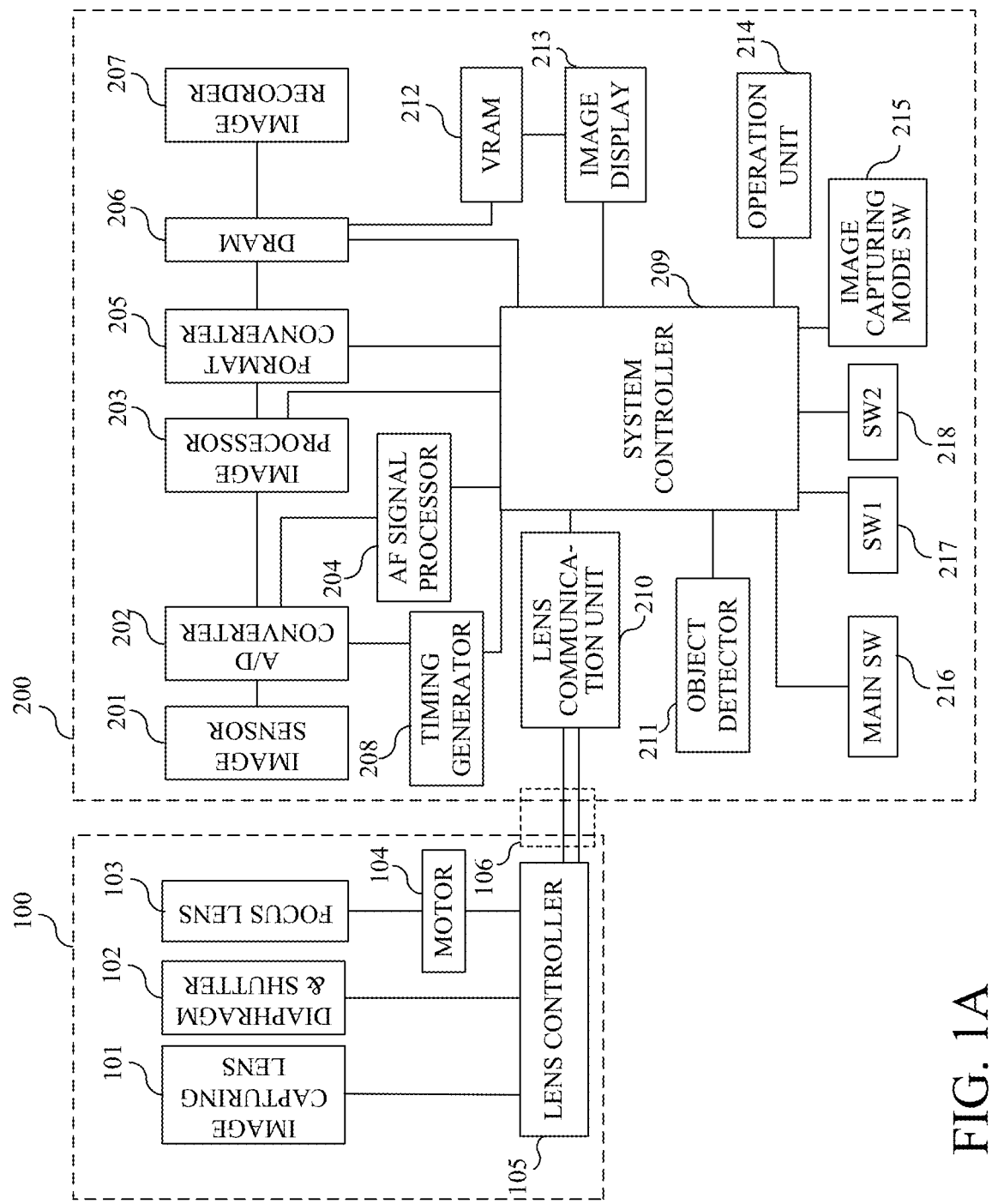
FIGS. 1A and 1B are block diagrams each illustrating a configuration of a camera system according to a first embodiment.

Referring now to the accompanying drawings, a detailed description will be given of embodiments of the present disclosure. Corresponding elements in respective figures will be designated by the same reference numerals, and a duplicate description thereof will be omitted.

First Embodiment

Figure 1B:
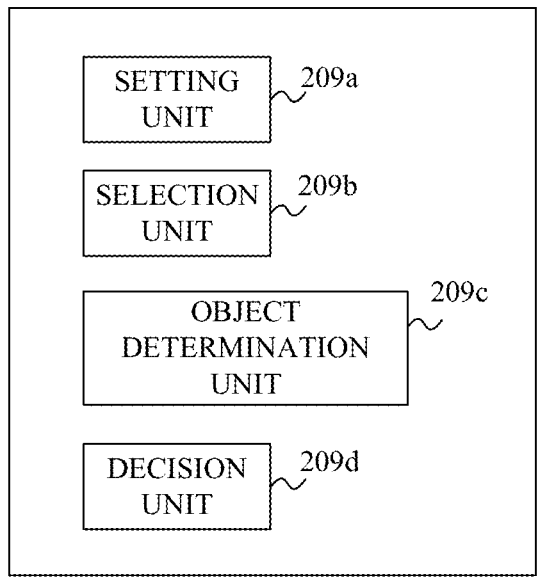

FIGS. 1A and 1B are block diagrams each illustrating a configuration of a camera system according to this embodiment. The camera system includes a lens apparatus (interchangeable lens) 100 and a camera body (image capturing apparatus) 200. The lens apparatus 100 is detachably attached to (interchangeably attached to) the camera body 200 via a mount (not illustrated), the mount including an electrical contact unit 106.

The lens apparatus 100 includes an optical system, a motor 104, and a lens controller 105. The optical system includes an image capturing lens 101, a diaphragm and shutter 102, and a focus lens 103. The image capturing lens 101 includes a zoom mechanism. The diaphragm and shutter 102 control a light amount. The focus lens 103 adjusts focus onto a light-receiving surface of an image sensor 201. The motor 104 drives the focus lens 103.

The camera body 200 includes the image sensor 201, an A/D converter 202, an image processor 203, an AF signal processor 204, a format converter 205, a memory (hereinafter referred to as DRAM) 206, an image recorder 207, and a timing generator 208. The camera body 200 further includes a system controller 209, a lens communication unit 210, an object detector 211, an image display memory (VRAM) 212, and an image display 213. The camera body 200 further includes an operation unit 214, an image capturing mode switch 215, a main switch 216, a switch 217 (hereinafter referred to as SW1), and an image capturing switch 218 (hereinafter referred to as SW2).

The image sensor 201 is a sensor such as a CCD sensor and a CMOS sensor and converts an object image formed via the optical system into an image signal. The A/D converter 202 includes a non-linear amplifier and a CDS circuit that eliminates noise of output from the image sensor 201. The DRAM 206 is a built-in memory such as a random-access memory and is used as a working memory for image compression/decompression and a temporary buffer. The image recorder 207 includes a recording medium such as a memory card and its interface. The lens communication unit 210 communicates with the lens apparatus 100. The image display 213 displays an image, a display for assisting operation, and a state of the camera system. At a time of image capturing, the image display 213 displays an image capturing screen and a focus detection area. The operation unit 214 includes a menu switch for setting various settings, such as a setting for an image capturing function of the camera body 200 and a setting for image playback, and a changeover switch for changing a mode to an image capturing mode and a playback mode. The operation unit 214 is used for operating the camera system from an outside of the camera system. The image capturing mode switch 215 is used to select an image capturing mode such as a macro mode and a sport mode. The main switch 216 is used for powering the camera system. SW1 is used for performing image capturing standby operation such as AF and AE. SW2 is used for capturing an image after the operation on SW1.

The system controller 209 controls the entire camera system. FIG. 1B is a block diagram illustrating the system controller 209. The system controller 209 includes a setting unit 209a, a selection unit 209b, an object determination unit 209c, and a decision unit 209d. In this embodiment, the system controller 209 is included in the camera body 200 but may be configured as a control apparatus separate from the camera body 200.

A photodiode converts a light beam entering from the lens apparatus 100 to the light-receiving surface of the image sensor 201 into a signal charge based on an entering light amount. The signal charge accumulated in each photodiode is sequentially read as a voltage signal from the image sensor 201 based on a driving pulse given by the timing generator 208 according to an instruction transmitted from the system controller 209.

Each pixel of the image sensor 201 used in this embodiment includes two (a pair of) photodiodes A and B and one microlens provided for the pair of photodiodes A and B. Each pixel divides the entering light beam at the microlens, forms a pair of optical images on the pair of photodiodes A and B, and outputs, from the pair of photodiodes A and B, a pair of pixel signals (A signal and B signal) to be used as an AF signal. An image pickup signal (A+B signal) can be acquired by adding the outputs from the pair of photodiodes A and B.

By combining the plurality of A signals output from the plurality of pixels and combining the plurality of B signals output from the plurality of pixels, a pair of image signals can be acquired as the AF signal (focus detection signal) to be used in autofocus by an image capturing plane phase difference detection method (image capturing plane phase difference AF). The AF signal processor 204 acquires a phase difference (hereinafter referred to as image shift amount) that is an amount of shift between the pair of image signals by performing a correlation calculation on the pair of image signals and acquires focus information including a defocus amount (focusing state), a defocus direction, and reliability of the optical system by using the image shift amount. The AF signal processor 204 acquires a plurality of defocus amounts in a plurality of predetermined areas that can be designated.

Figure 2:
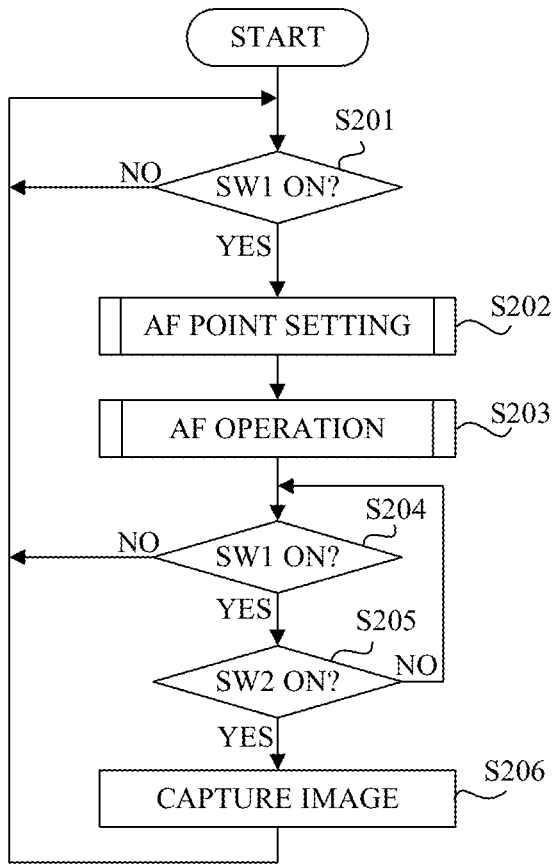
FIG. 2 is a flowchart illustrating a process performed by the camera system during image capturing according to the first embodiment.

FIG. 2 is a flowchart illustrating a process performed by the camera system during image capturing according to this embodiment.

In step S201, the system controller 209 determines whether or not the SW1 is turned on. If the system controller 209 determines that the SW1 is turned on, the process proceeds to step S202, and if the system controller 209 does not determine that the SW1 is turned on, the process of this step is repeated.

In step S202 (setting), the system controller 209 (setting unit 209a) performs AF point setting for setting a plurality of AF points (focusing point).

In step S203, the system controller 209 performs AF operation.

In step S204, the system controller 209 determines whether or not the SW1 is turned on. If the system controller 209 determines that SW1 is turned on, the process proceeds to step S205, and if the system controller 209 does not determine that SW1 is turned on, the process returns to step S201.

In step S205, the system controller 209 determines whether or not the SW2 is turned on. If the system controller 209 determines that SW2 is turned on, the process proceeds to step S206, and if the system controller 209 does not determine that the SW2 is turned on, the process returns to step S204.

In step S206, the system controller 209 causes the camera system to perform image capturing operation.

Figure 3:
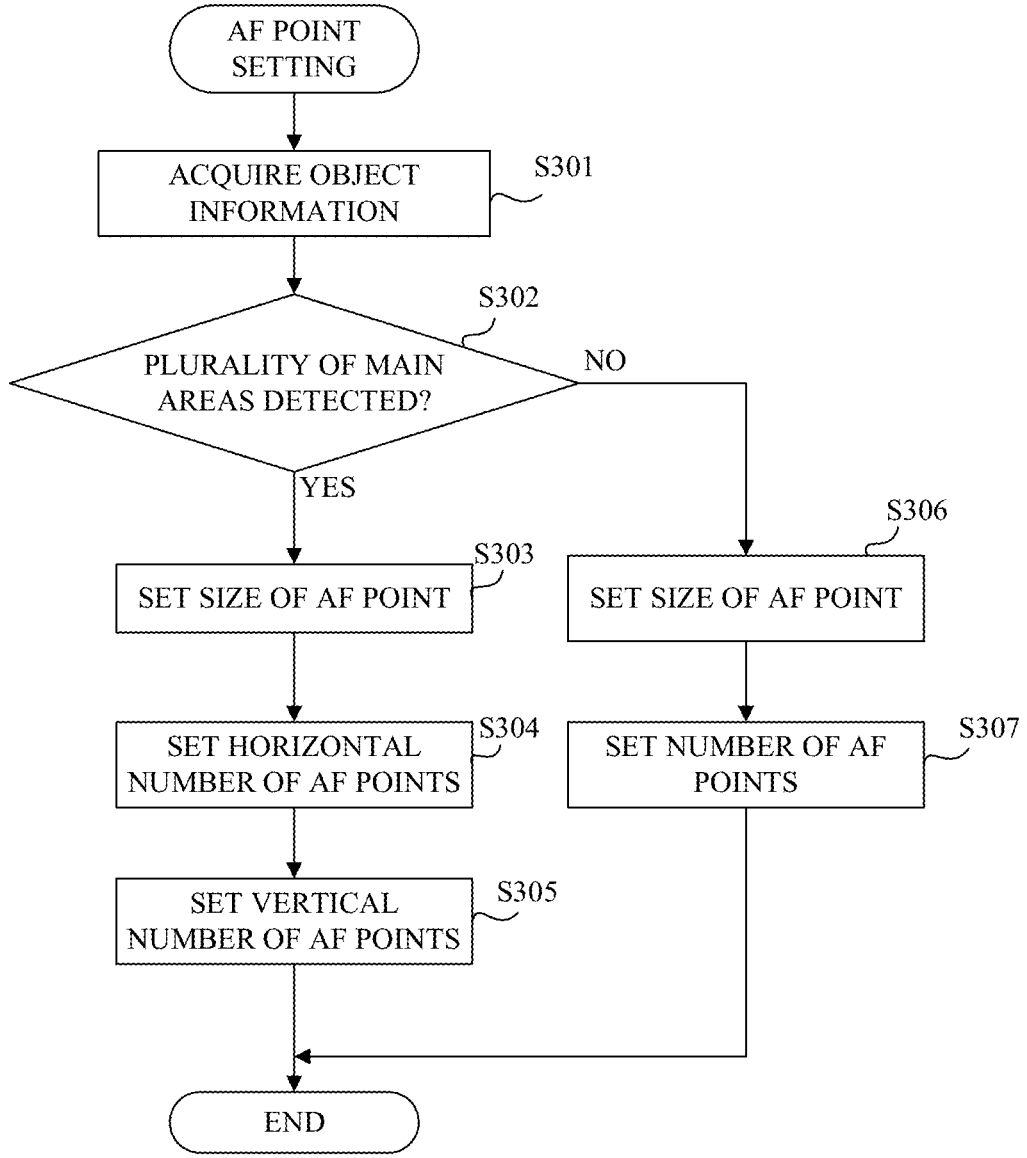
FIG. 3 is a flowchart illustrating AF point setting according to the first embodiment.

FIG. 3 is a flowchart illustrating the AF point setting in step S202 of FIG. 2.

In step S301, the system controller 209 acquires object information from the object detector 211. In this embodiment, the object detector 211 detects an object such as a person and an animal (for example, a dog, a wild bird, or the like) and a main area such as a pupil, face, and body of the object by using learning by deep learning, image processing, or the like. The object information is information including a type of the object (a person or an animal) and center coordinates, a horizontal size, and a vertical size of the main area.

Figure 4A:
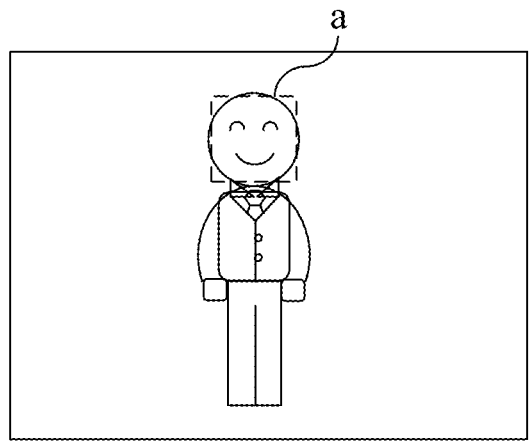
FIGS. 4A to 4D are diagrams each illustrating a state in which a main area is detected.
Figure 4B:
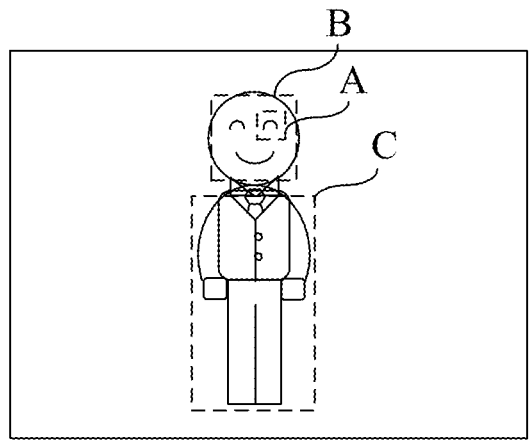
Figure 4C:
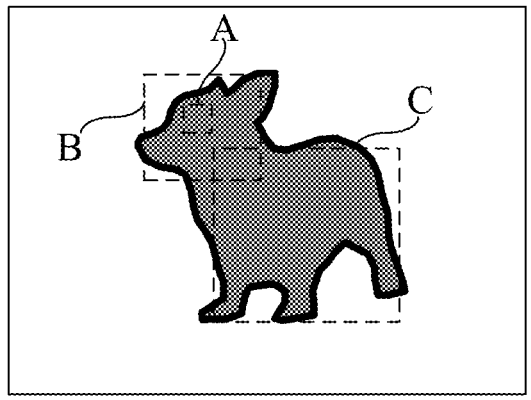
Figure 4D:
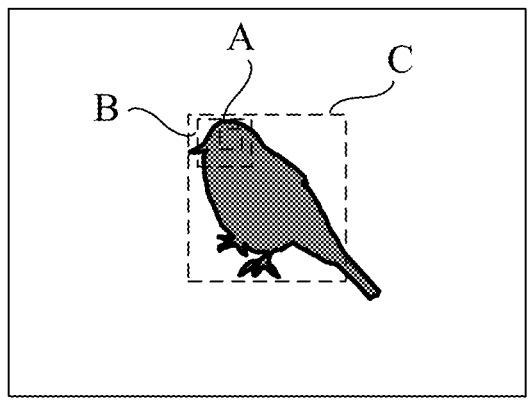

In step S302, the system controller 209 determines, by using the object information, whether or not a plurality of main areas are detected. FIGS. 4A to 4D are diagrams each illustrating a state in which a main area is detected. FIG. 4A illustrates a state in which a single main area (face a) is detected in a case where the object is a person. FIG. 4B illustrates a state in which a plurality of main areas (pupil A, face B, and body C) are detected in a case where the object is a person. FIGS. 4C and 4D illustrate states in each of which a plurality of main areas (pupil A, face B, and body C) are detected in a case where the object is an animal. If the system controller 209 determines that the plurality of main areas are detected, the process proceeds to step S303, and if the system controller 209 does not determine that the plurality of main areas are detected, the process proceeds to step S306.

In step S303, the system controller 209 sets a size of the AF point to a smaller value (MinA) of a horizontal size and a vertical size of a minimum main area (for example, pupil A in FIGS. 4B to 4D).

Figure 5A:
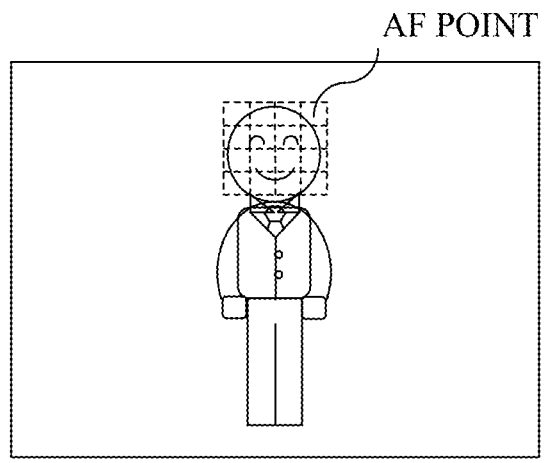
FIGS. 5A to 5D are diagrams illustrating the AF point setting in the states of FIGS. 4A to 4D, respectively.
Figure 5C:
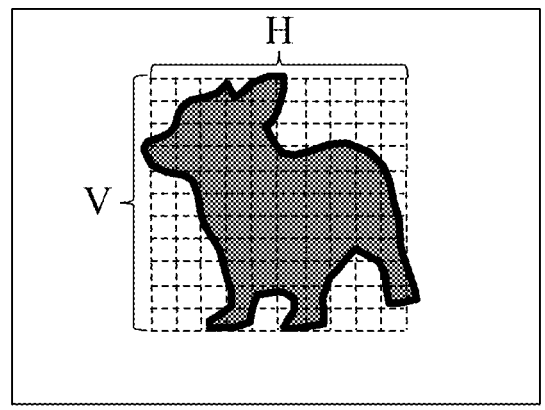
Figure 5B:
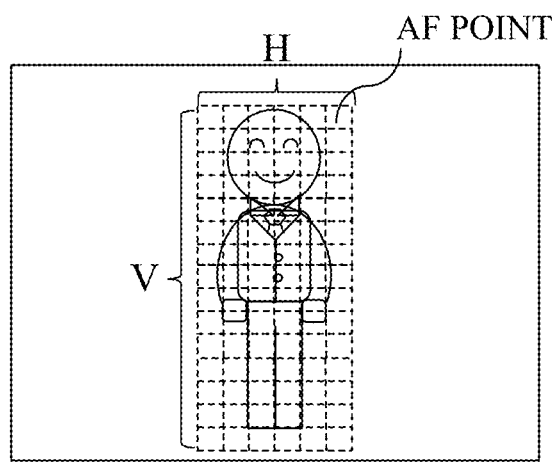
Figure 5D:
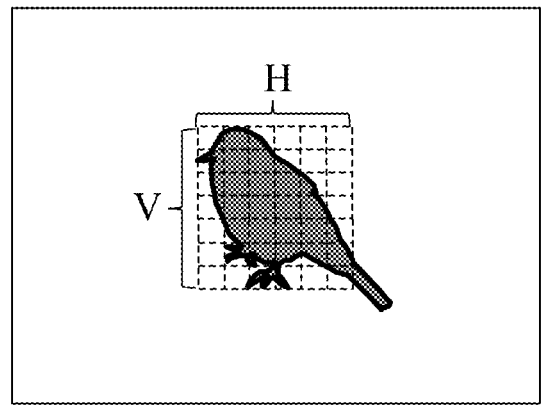

In step S304, the system controller 209 acquires a horizontal size of an area including every main area by using horizontal coordinates and a horizontal size of each main area. Thereafter, the system controller 209 sets a horizontal number of AF points to a value acquired by dividing the acquired horizontal size by the size MinA of the AF point set in step S304. For example, as illustrated in FIGS. 5B to 5D, the system controller 209 sets the horizontal number of the AF points to a value (H/MinA) acquired by dividing a horizontal size H of an area including the plurality of main areas (pupil A, face B, and body C) by the size MinA of the AF point.

In step S305, the system controller 209 acquires a vertical size of the area including every main area by using vertical coordinates and a vertical size of each main area. Thereafter, the system controller 209 sets a vertical number of AF points to a value acquired by dividing the acquired vertical size by the size MinA of the AF point set in step S304. For example, as illustrated in FIGS. 5B to 5D, the system controller 209 sets the vertical number of the AF points to a value (V/MinA) acquired by dividing a vertical size V of the area including the plurality of main areas (pupil A, face B, and body C) by the size MinA of the AF point.

In this embodiment, a shape of the AF point is a square shape but may be a rectangular shape in which a length in the horizontal direction and a length in the vertical direction are different. The number of the AF points may be set to a number that can be calculated by the system controller 209.

In step S306, the system controller 209 sets an AF point having a predetermined size on the main area. For example, as illustrated in FIG. 5A, the system controller 209 sets AF points each having a predetermined size X on the face a. The predetermined size may be a size of a pupil estimated by using a size of the face or may be a size with which an S/N ratio can be ensured and focusing performance is sufficient in consideration of a case of a low illuminance environment.

In step S307, the system controller 209 sets the number of the AF points to a number such that the main area is included in the AF points set in step S306. For example, in FIG. 5A, the system controller 209 sets the number of the AF points to Y with which the AF points can include the face a.

Figure 6A:
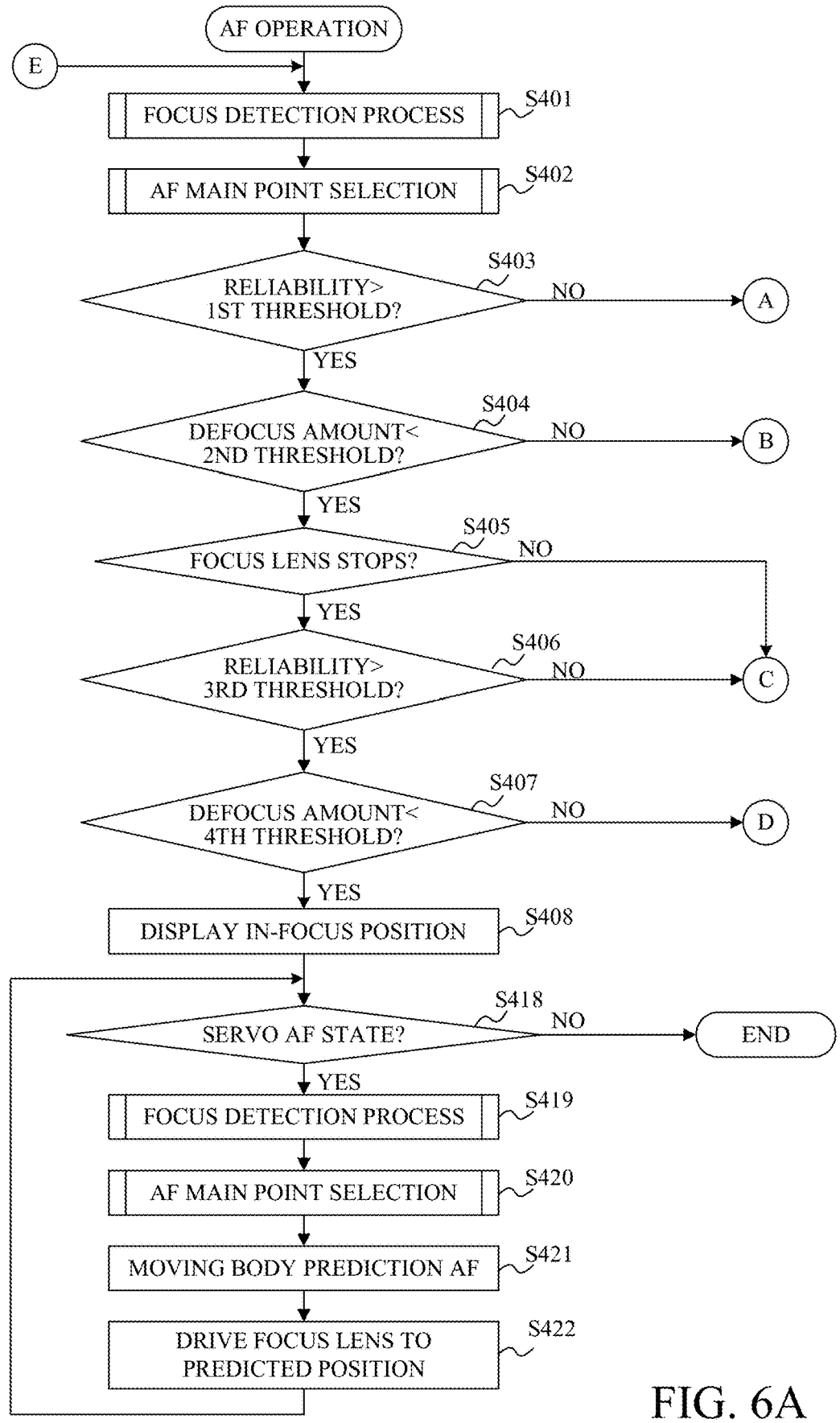
FIGS. 6A and 6B are flowcharts illustrating AF operation according to the first embodiment.
Figure 6B:
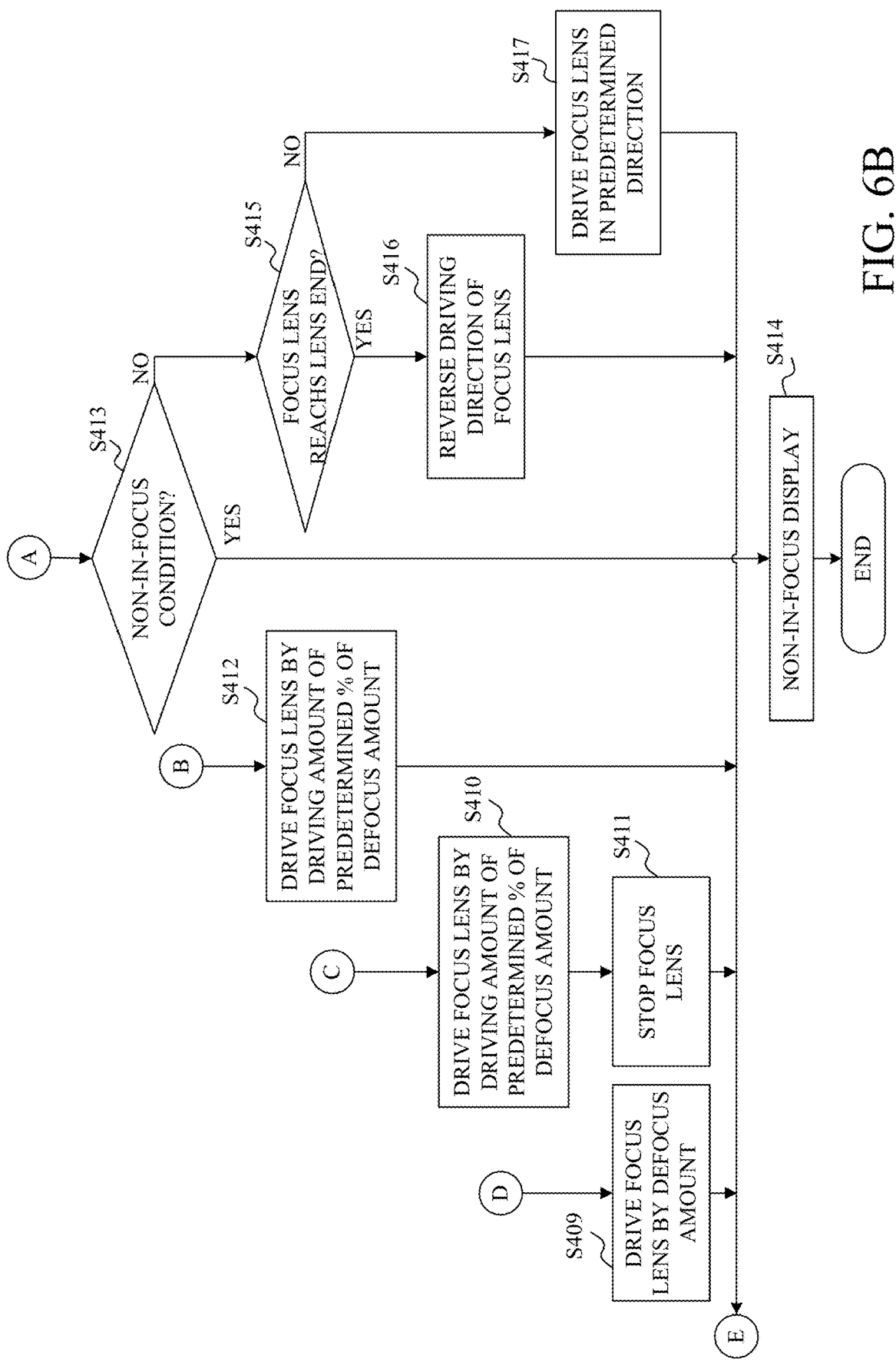

FIGS. 6A and 6B are flowcharts illustrating the AF operation in step S203 of FIG. 2.

In step S401, the system controller 209 causes the AF signal processor 204 to execute a focus detection process and acquires focus information including a defocus amount and reliability.

In step S402 (selecting), the system controller 209 (selection unit 209b) performs AF main point selection by using the reliability acquired in step S401.

In step S403, the system controller 209 determines whether or not the reliability acquired in step S401 is higher than a preset first threshold. The first threshold is set such that if the reliability is lower than the first threshold, accuracy of the defocus amount cannot be ensured but a focus position direction of the object can be ensured. If the system controller 209 determines that the reliability is higher than the first threshold, the process proceeds to step S404, and if the system controller 209 does not determine that the reliability is higher than the first threshold, the process proceeds to step S413. It is possible to arbitrarily set which step to proceed to if the reliability is equal to the first threshold.

In step S404, the system controller 209 determines whether or not the defocus amount acquired in step S401 is smaller than a preset second threshold. The second threshold is a value such that if the defocus amount is smaller than the second threshold, the image sensor 201 can be placed within a focal depth by controlling driving of the focus lens 103 by the defocus amount a predetermined number of times (for example, three times). For example, the second threshold is a value of five times the focal depth. If the system controller 209 determines that the defocus amount is smaller than the second threshold, the process proceeds to step S405, and if the system controller 209 does not determine that the defocus amount is smaller than the second threshold, the process proceeds to step S412. It is possible to arbitrarily set which step to proceed to if the defocus amount is equal to the second threshold.

In step S405, the system controller 209 determines whether or not the focus lens 103 stops. If the system controller 209 determines that the focus lens 103 stops, the process proceeds to step S406, and if the system controller 209 does not determine that the focus lens 103 stops, the process proceeds to step S410.

In step S406, the system controller 209 determines whether or not the reliability acquired in step S401 is higher than a preset third threshold. The third threshold is set such that if the reliability is higher than the third threshold, accuracy variation in the defocus amount is within a predetermined range (for example, smaller than the focal depth). If the system controller 209 determines that the reliability is higher than the third threshold, the process proceeds to step S407, and if the system controller 209 does not determine that the reliability is higher than the third threshold, the process proceeds to step S410. It is possible to arbitrarily set which step to proceed to if the reliability is equal to the third threshold.

In step S407, the system controller 209 determines whether or not the defocus amount acquired in step S401 is smaller than a preset fourth threshold. The fourth threshold is set such that if the defocus amount is smaller than the fourth threshold, the focus lens 103 is controlled to a position such that the image sensor 201 is within the focal depth. If the system controller 209 determines that the defocus amount is smaller than the fourth threshold, the process proceeds to step S408, and if the system controller 209 does not determine that the defocus amount is smaller than the fourth threshold, the process proceeds to step S409. It is possible to arbitrarily set which step to proceed to if the defocus amount is equal to the fourth threshold.

In step S408, the system controller 209 causes the image display 213 to display an in-focus point.

In step S409, the system controller 209 drives, via the lens controller 105, the focus lens 103 by the defocus amount acquired in step S401. By performing the processes in steps S405 to S409, in a case where the reliability acquired in step S401 is higher than the third threshold, the defocus amount can be detected again with the focus lens 103 stopped.

In step S410, the system controller 209 drives, via the lens controller 105, the focus lens 103 by a driving amount that is a predetermined percentage of the defocus amount acquired in step S401.

In step S411, the system controller 209 stops the focus lens 103 via the lens controller 105.

In step S412, the system controller 209 drives, via the lens controller 105, the focus lens 103 by a driving amount that is a predetermined percentage of the defocus amount acquired in step S401. The predetermined percentage is, for example, 80% and is set such that the driving amount of the focus lens 103 is smaller than the defocus amount. A speed of the focus lens 103 is, for example, set to be slower than a speed at which the driving is completed in one frame time. Thereby, it is possible to prevent the object focus position from being exceeded in a case where the defocus amount is incorrect, and it is possible to perform the next driving while the focus lens 103 is driven without being stopped, that is, overlap control can be performed.

In step S413, the system controller 209 determines whether or not a non-in-focus condition is satisfied, the non-in-focus condition being a condition for determining that the object to be focused on does not exist. The non-in-focus condition is set to a condition in which, for example, the driving of the focus lens 103 in an entire movable range has been completed, that is, the focus lens 103 detects both far and close lens ends and returns to an initial position. If the system controller 209 determines that the non-in-focus condition is satisfied, the process proceeds to step S414, and if the system controller 209 does not determine that the non-in-focus condition is satisfied, the process proceeds to step S415.

In step S414, the system controller 209 causes the image display 213 to provide an out-of-focus display.

In step S415, the system controller 209 determines whether or not the focus lens 103 has reached the far or close lens end. If the system controller 209 determines that the focus lens 103 has reached the lens end, the process proceeds to step S416, and if the system controller 209 does not determine that the focus lens 103 has reached the lens end, the process proceeds to step S417.

In step S416, the system controller 209 reverses the driving direction of the focus lens 103 via the lens controller 105.

In step S417, the system controller 209 drives the focus lens 103 in a predetermined direction via the lens controller 105. The speed of the focus lens 103 is set to, for example, the fastest speed in a range of speeds such that the focus position is not passed at a time when the defocus amount becomes detectable.

In step S418, the system controller 209 determines whether or not the state is a servo AF state in which an AF mode set by the operation unit 214 is a servo AF mode and the SW1 is turned on. If the system controller 209 determines that the state is the servo AF state, the process proceeds to step S419, and if the system controller 209 does not determine that the state is the servo AF state, this flow ends.

In step S419, the system controller 209 causes the AF signal processor 204 to execute the focus detection process and acquires focus information including a defocus amount and reliability.

In step S420, the system controller 209 (selection unit 209b) performs the AF main point selection by using the reliability acquired in step S419.

In step S421, the system controller 209 performs a moving body prediction AF process for predicting a focus position (predicted position) of the object in a target frame by using history information on object positions in a plurality of previous frames.

In step S422, the system controller 209 drives the focus lens 103 to the predicted position predicted in step S421.

Figure 7:
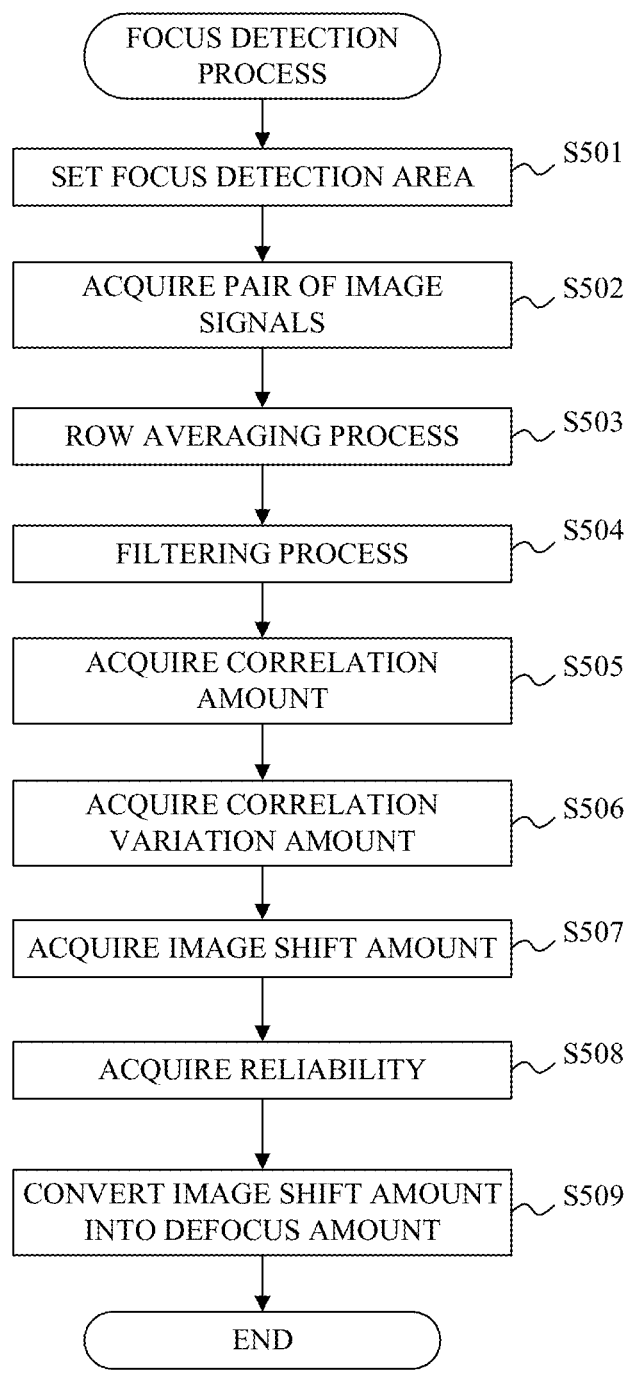
FIG. 7 is a flowchart illustrating a focus detection process according to the first embodiment.

FIG. 7 is a flowchart illustrating the focus detection process in step S401 and step S419 of FIG. 6A.

In step S501, the AF signal processor 204 sets the focus detection area in an arbitrary range of the image sensor 201.

In step S502, the AF signal processor 204 acquires a pair of image signals in the focus detection area set in step S501, the pair of image signals being output from the image sensor 201.

In step S503, the AF signal processor 204 performs a row averaging process in a vertical direction on the pair of image signals acquired in step S502 so as to reduce an effect of noise included in the pair of image signals.

In step S504, the AF signal processor 204 performs a filtering process for extracting a signal component in a predetermined frequency band from the signal on which the row averaging process in the vertical direction has been performed in step S503.

In step S505, the AF signal processor 204 acquires a correlation amount by using the signal on which the filtering process has been performed in step S504.

In step S506, the AF signal processor 204 acquires a correlation variation amount by using the correlation amount acquired in step S505.

In step S507, the AF signal processor 204 acquires an image shift amount by using the correlation variation amount acquired in step S506.

In step S508, the AF signal processor 204 acquires reliability indicating how reliable the image shift amount acquired in step S507 is.

In step S509, the AF signal processor 204 converts the image shift amount into a defocus amount.

Figure 8:
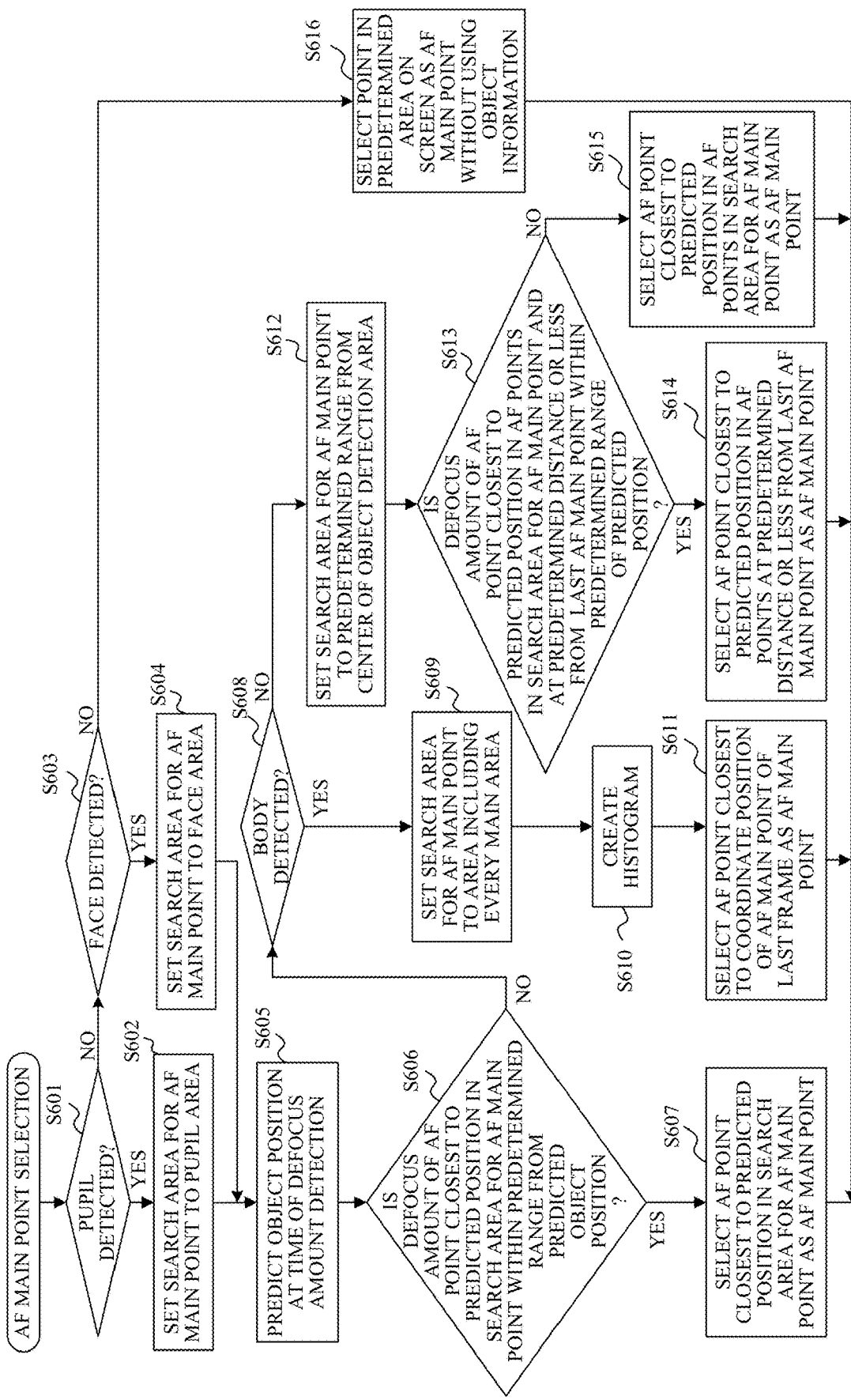
FIG. 8 is a flowchart illustrating AF main point selection according to the first embodiment.

FIG. 8 is a flowchart illustrating the AF main point selection in steps S402 and S420 of FIG. 6A according to this embodiment.

In step S601, the system controller 209 determines whether or not the object detector 211 detects the pupil of the object. If the system controller 209 determines that the object detector 211 detects the pupil of the object, the process proceeds to step S602, and if the system controller 209 does not determine that the object detector 211 detects the pupil of the object, the process proceeds to step S603.

In step S602, the system controller 209 (decision unit 209d) sets a search area for the AF main point (main focusing point) to a pupil area.

In step S603, the system controller 209 determines whether or not the object detector 211 detects the face of the object. If the system controller 209 determines that the object detector 211 detects the face of the object, the process proceeds to step S604, and if the system controller 209 does not determine that the object detector 211 detects the face of the object, the process proceeds to step S616.

In step S604, the system controller 209 (decision unit 209d) sets the search area for the AF main point to a face area.

The processes in steps S601 and S603 are performed based on a priority of the part of the object detected by the object detector 211. In this embodiment, the priorities are set so that the pupil, face, and body are prioritized in this order, but different priorities may be set if necessary. For example, the priorities may be set based on a posture of the object or an orientation of the camera system.

In step S605, by using the history information on the object positions in the plurality of previous frames, the system controller 209 predicts the object position (predicted position) at a time when the defocus amount of the target frame is detected.

In step S606 (determining), the system controller 209 (determination unit 209c) determines whether or not the defocus amount of an AF point is within a predetermined range from the predicted position, the AF point being closest to the predicted position in AF points in the search area for the AF main point. The predetermined range is a range (for example, twice the amount of the focal depth) such that if the defocus amount is within the predetermined range, the object is regarded as the same object as an object focused on in a previous frame and may be set in consideration of a prediction error and a focus detection error. The predetermined range does not have to be a fixed value and may be changed depending on the speed of the object, a distance to the object, and other conditions. In this step, only AF points whose reliability of the defocus amount is higher than a predetermined threshold may be selected. If the system controller 209 determines that the defocus amount is within the predetermined range, the process proceeds to step S607, and if the system controller 209 does not determine that the defocus amount is within the predetermined range, the process proceeds to step S608.

In step S607, the system controller 209 (selection unit 209b) selects, as the AF main point, the AF point closest to the predicted position in the AF points in the search area for the AF main point.

In step S608, the system controller 209 determines whether or not the object detector 211 detects the body of the object. If the system controller 209 determines that the object detector 211 detects the body of the object, the process proceeds to step S609, and if the system controller 209 does not determine that the object detector 211 detects the body of the object, the process proceeds to step S612.

In step S609 (deciding), the system controller 209 (decision unit 209d) sets the search area for the AF main point to an area including every main area, that is, including every part of the object. The area including every main area may be determined by the method described with reference to FIGS. 5A to 5D. Alternatively, the search area for the AF main point may be set to an area acquired by multiplying the area determined by the method described with reference to FIGS. 5A to 5D by a preset magnification.

In step S610, the system controller 209 counts the defocus amount acquired in step S509 in the search area for the AF main point for each predetermined depth and creates a histogram. In this embodiment, the defocus amount itself is used in creating the histogram, but a predicted value corresponding to the object position acquired by using the defocus amount for each AF point may be used in creating the histogram in consideration of a moving object.

In step S611, the system controller 209 (selection unit 209b) selects an AF point as the AF main point, the AF point being closest to a coordinate position of the AF main point of the last frame in the AF points counted as histogram peaks. This increases a possibility that an AF point is selected, the AF point including the same object as an object that was in focus in a previous frame.

In step S612 (deciding), the system controller 209 (decision unit 209d) sets the search area for the AF main point to an area of a predetermined range from the center of the object detection area. The predetermined range is set to be larger than a size of the object detected by the object detector 211. Thereby, a more suitable AF point can be selected from a larger area even when it is not possible to select an AF point including the same object as an object in a previous frame from a small area of the face or the pupil. The predetermined range may be a fixed value or a value acquired by multiplying the size of the object by a magnification.

In step S613, the system controller 209 (determination unit 209c) determines whether or not a defocus amount of an AF point is within a predetermined range from the predicted position, the AF point being closest to the predicted position in AF points which are included in the search area for the AF main point and whose distance to the last AF main point is a predetermined value or less. In a case where the AF main point is selected from the AF points which are included in the search area for the AF main point and whose distance to the last AF main point is the predetermined value or less, it is more likely that an AF point including the same object as an object included in a previous frame can be selected as the AF main point. If the system controller 209 determines that the defocus amount is within the predetermined range, the process proceeds to step S614, and if the system controller 209 does not determine that the defocus amount is within the predetermined range, the process proceeds to step S615.

In step S614, the system controller 209 (selection unit 209b) selects the AF point determined in step S613 as the AF main point, the AF point being closest to the predicted position in the AF points whose distance to the last AF main point is the predetermined value or less.

In step S615, the system controller 209 (selection unit 209b) selects, as the AF main point, an AF point closest to the predicted position in AF points in the search area for the AF main point.

In step S616, the system controller 209 (selection unit 209b) selects, as the AF main point, a point in a predetermined area on a screen without using the object information.

As described above, according to the configuration of this embodiment, in a case where the plurality of parts of the object are detected, it is possible to accurately perform focusing on an area with a higher priority while an area where focus detection is difficult is avoided to be focused on. For example, in a case where the object is an animal such as a dog, a cat, and a bird, or a person playing a sport, it is possible to perform focusing on an AF point that is likely to include the same object as an object included in a previous frame.

Second Embodiment

A basic configuration of a camera system according to this embodiment is similar to the configuration of the camera system according to the first embodiment, and in this embodiment, a description will be given of points different from the configuration described in the first embodiment.

A system controller 209 according to this embodiment includes an obstruction determination unit 209e instead of the object determination unit 209c.

Figure 9:
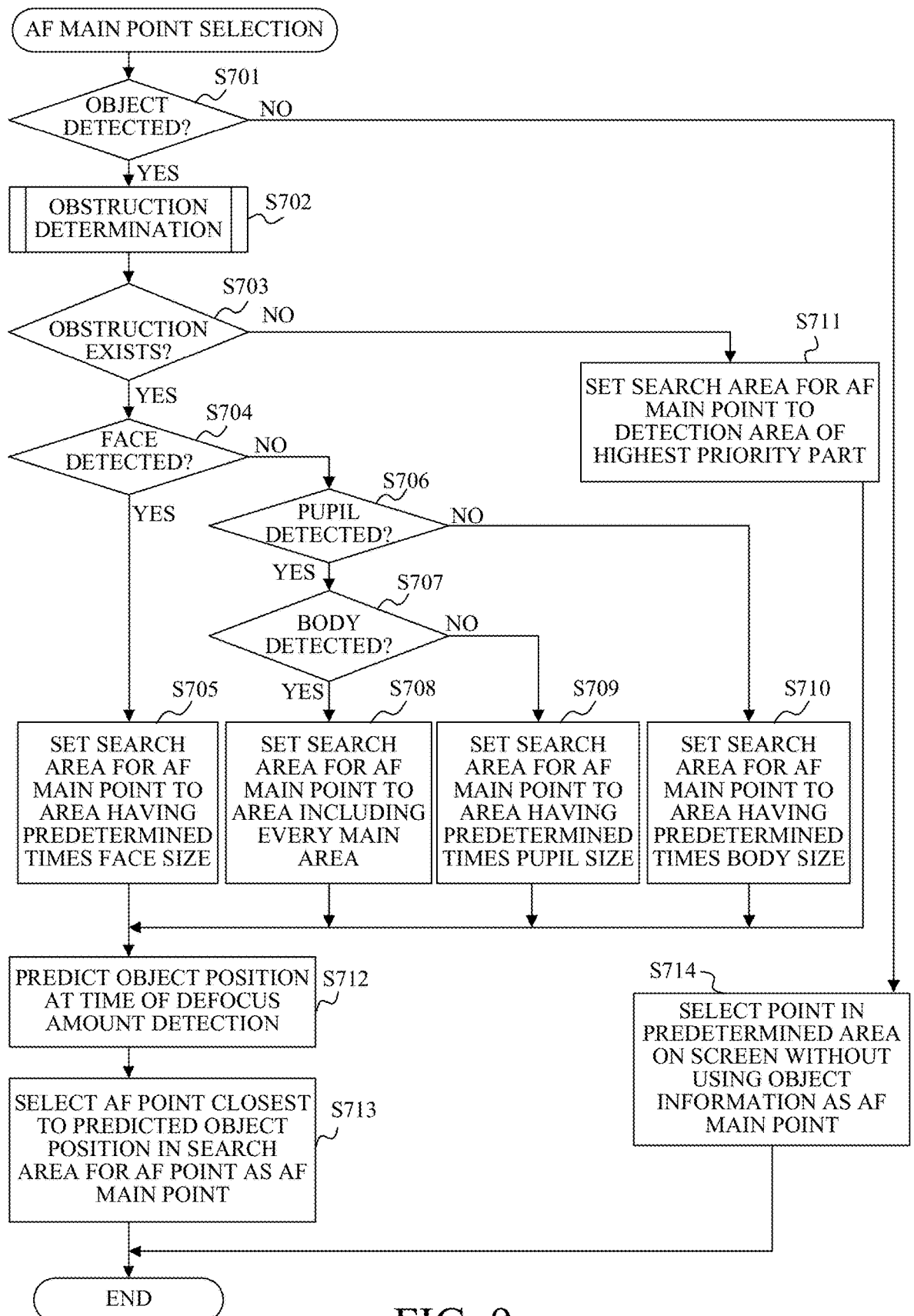
FIG. 9 is a flowchart illustrating AF main point selection according to a second embodiment.

FIG. 9 is a flowchart illustrating AF main point selection in steps S402 and S420 in FIG. 6A according to this embodiment.

In step S701, the system controller 209 determines whether or not an object detector 211 detects a part of an object (at least one of a pupil, face, and body). If the system controller 209 determines that the part of the object is detected, the process proceeds to step S702, and if the system controller 209 does not determine that the part of the object is detected, the process proceeds to step S714.

In step S702, the system controller 209 makes an obstruction determination. The obstruction determination is to determine whether or not an object that is an obstruction is included in an object area detected by the object detector 211 or in an area in the vicinity of the object area.

In step S703 (determining), by using the obstruction determination, the system controller 209 (obstruction determination unit 209e) determines whether or not an obstruction exists. If the system controller 209 determines that the obstruction exists, the process proceeds to step S704, and if the system controller 209 does not determine that the obstruction exists, the process proceeds to step S711.

In step S704, the system controller 209 determines whether or not the object detector 211 detects the face of the object. If the system controller 209 determines that the object detector 211 detects the face of the object, the process proceeds to step S705, and if the system controller 209 does not determine that the object detector 211 detects the face of the object, the process proceeds to step S706.

In step S705 (deciding), the system controller 209 (decision unit 209d) sets a search area for an AF main point to an area having a size of predetermined times a size of the face detected by the object detector 211 (an area having a size larger than the size of the face), which makes it possible to reduce an effect of the obstruction.

In step S706, the system controller 209 determines whether or not the object detector 211 detects the pupil of the object. If the system controller 209 determines that the object detector 211 detects the pupil of the object, the process proceeds to step S707, and if the system controller 209 does not determine that the object detector 211 detects the pupil of the object, the process proceeds to step S710.

In step S707, the system controller 209 determines whether or not the object detector 211 detects the body of the object. If the system controller 209 determines that the object detector 211 detects the body of the object, the process proceeds to step S708, and if the system controller 209 does not determine that the object detector 211 detects the body of the object, the process proceeds to step S709.

In step S708 (deciding), the system controller 209 (decision unit 209d) sets the search area for the AF main point to an area including every main area, that is, including every part of the object. The area including every main area may be determined by the method described with reference to FIGS. 5A to 5D. Alternatively, the search area for the AF main point may be set to an area acquired by multiplying the area determined by the method described with reference to FIGS. 5A to 5D by a preset magnification.

In step S709 (deciding), the system controller 209 (decision unit 209d) sets the search area for the AF main point to an area having a size of predetermined times a size of the pupil detected by the object detector 211 (an area having a size larger than a size of the face estimated from the size of the pupil), which makes it possible to reduce the effect of the obstruction.

In step S710 (deciding), the system controller 209 (decision unit 209d) sets the search area for the AF main point to an area having a size of predetermined times a size of the body detected by the object detector 211 (an area having a size larger than 1 times the size of the body), which makes it possible to reduce the effect of the obstruction.

In step S711 (deciding), the system controller 209 (decision unit 209d) sets the search area for the AF point to an area including a detected part with the highest priority in the parts detected by the object detector 211. In this embodiment, the priorities are set so that the pupil, face, and body are prioritized in this order, but different priorities may be set if necessary. For example, the priorities may be set based on a posture of the object or an orientation of the camera system.

In step S712, by using the history information on the object positions in the plurality of previous frames, the system controller 209 predicts the object position (predicted position) at the time when the defocus amount of the target frame is detected.

In step S713, the system controller 209 selects, as the AF main point, an AF point closest to the predicted position in the AF points in the search area for the AF main point. Alternatively, the system controller 209 may create a histogram by counting a defocus amount for each predetermined depth and may select, as the AF main point, an AF point closest to a coordinate position of the AF main point of the last frame in the AF points counted as histogram peaks.

In step S714, the system controller 209 selects, as the AF main point, a point in a predetermined area on the screen without using the object information.

Figure 10:
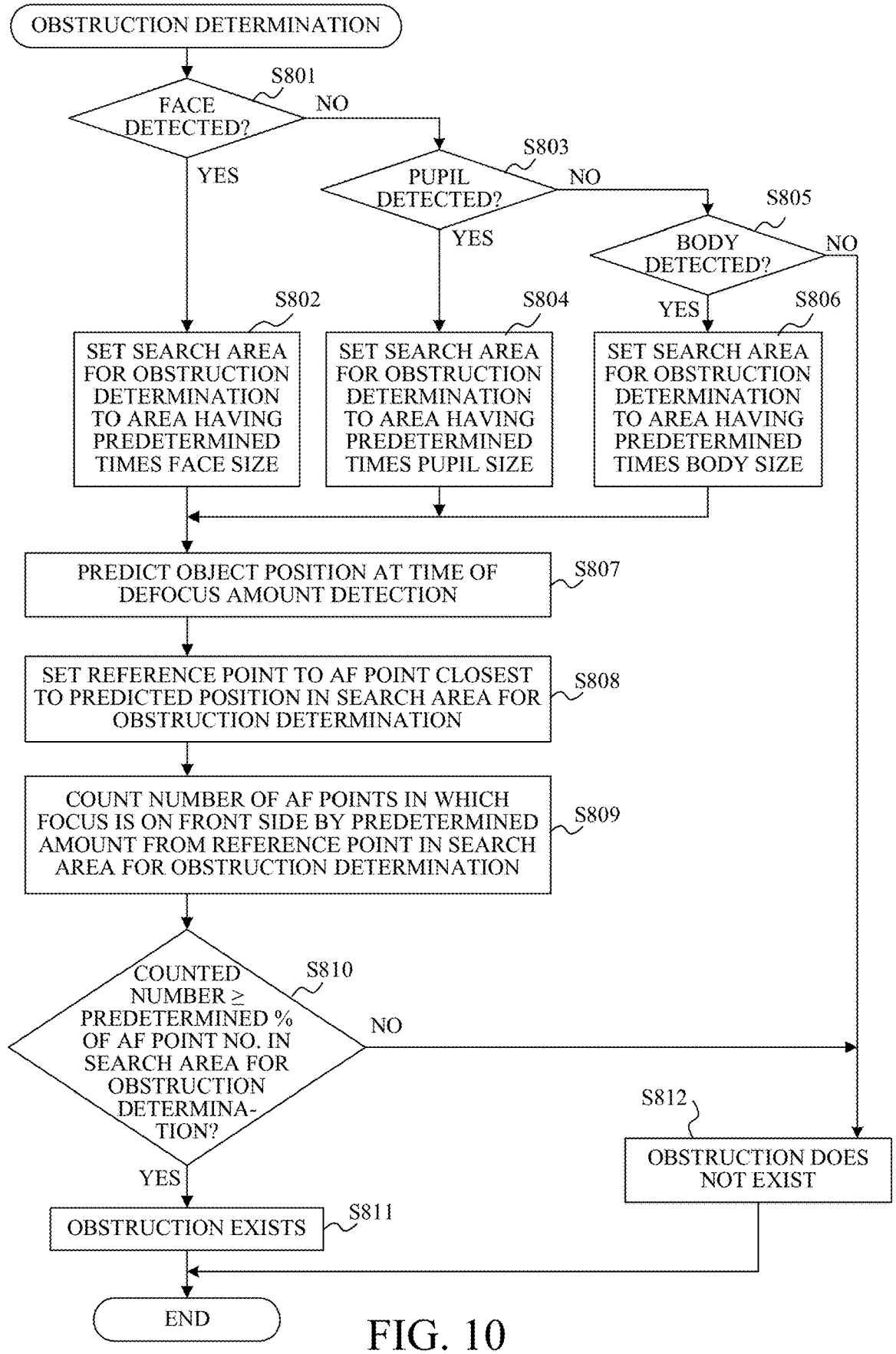
FIG. 10 is a flowchart illustrating obstruction determination according to the second embodiment.

FIG. 10 is a flowchart illustrating the obstruction determination in step 702 of FIG. 9.

In step S801, the system controller 209 determines whether or not the object detector 211 detects the face of the object. If the system controller 209 determines that the object detector 211 detects the face of the object, the process proceeds to step S802, and if the system controller 209 does not determine that the object detector 211 detects the face of the object, the process proceeds to step S803.

In step S802, the system controller 209 sets a search area for obstruction determination to an area having a size of predetermined times a size of the face detected by the object detector 211.

In step S803, the system controller 209 determines whether or not the object detector 211 detects the pupil of the object. If the system controller 209 determines that the object detector 211 detects the pupil of the object, the process proceeds to step S804, and if the system controller 209 does not determine that the object detector 211 detects the pupil of the object, the process proceeds to step S805.

In step S804, the system controller 209 sets the search area for the obstruction determination to an area having a size of predetermined times a size of the pupil detected by the object detector 211.

In step S805, the system controller 209 determines whether or not the object detector 211 detects the face of the object. If the system controller 209 determines that the object detector 211 detects the face of the object, the process proceeds to step S806, and if the system controller 209 does not determine that the object detector 211 detects the face of the object, the process proceeds to step S812.

In step S806, the system controller 209 sets the search area for the obstruction determination to an area having a size of predetermined times a size of the body detected by the object detector 211.

In step S807, by using the history information on the object positions in the plurality of previous frames, the system controller 209 predicts the object position (predicted position) at the time when the defocus amount of the target frame is detected.

In step S808, the system controller 209 sets a reference point to an AF point closest to the predicted position in AF points in the search area for the obstruction determination.

In step S809, the system controller 209 counts a number of AF points each of which is in a front-focused state in which focus is on a position on a front side by a predetermined amount from a defocus amount of the reference point in the search area for the obstruction determination. The predetermined amount is set to, for example, twice a focal depth, is a range for determining that an object is not the same as an object focused on in a previous frame but is an obstruction, and may be set in consideration of a prediction error and a focus detection error. The predetermined amount does not have to be a fixed value and may change depending on a speed, a distance, and other conditions of the object. The obstruction is considered to be located on a closer side than a position of the object, and thus the system controller 209 counts only the number of AF points in the front-focused state.

In step S810, the system controller 209 determines whether or not the counted number is equal to or larger than a predetermined percentage of the number of AF points in the search area for the obstruction determination. An obstruction has a certain size, and thus it is more likely that the obstruction exists as the number of counts increases. Therefore, an error in the determination can be reduced by determining that the obstruction exists only when the counted number is larger than a certain percentage (for example, 20%) of the AF points in the search area for the obstruction determination. The determination may be made not based on the percentage but based on a fixed number or the like. In this embodiment, the obstruction is determined based on the defocus amount in the object area, but whether or not the obstruction exists in the object area may be determined by a learning method using deep learning, image processing, or the like. If the system controller 209 determines that the counted number is equal to or larger than the predetermined percentage, the process proceeds to step S811, and if the system controller 209 does not determine that the counted number is equal to or larger than the predetermined percentage, the process proceeds to step S812.

In step S811, the system controller 209 determines that the obstruction exists.

In step S812, the system controller 209 determines that the obstruction does not exist.

As described above, in a case where a plurality of parts of the object are detected and an obstruction exists in the object detection area, the configuration of this embodiment can accurately perform focusing on an area with a higher priority while avoiding focusing on a difficult area.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Each of the above-described embodiments can provide a control apparatus that can perform accurate focusing on an area with a higher priority while avoiding focusing on an area in which focus detection is difficult, even when an obstruction or a background are included in an object area on a far side or a close side of the object.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-068951, filed on Apr. 15, 2021, which is hereby incorporated by reference herein in its entirety.

What is claimed is:

1. A control apparatus comprising:
   at least one processor; and
   at least one memory coupled to the at least one processor storing instructions that, when executed by the at least one processor, cause the at least one processor to function as:
   a setting unit configured to set a search area by using object information that includes information on a part of an object and is based on an image signal converted from an object image; and
   a selection unit configured to select, at a first timing, from a plurality of focusing points in the search area, a main focusing point on which focusing is performed,
   wherein the setting unit sets the search area based on a determination, by using a focusing state of a focusing point corresponding to a part with a highest priority in priorities set for respective parts of the object by at least one of initial setting, user setting, or settings based on a posture of the object or an orientation of a camera system, whether or not the object included in the focusing point corresponding to the part is the same as an object included in a previously selected main focusing point, which is selected at a second timing before the first timing.

2. The control apparatus according to claim 1, wherein the setting unit determines that:
   the object included in the focusing point corresponding to the part is the same as the object included in the previously selected main focusing point if either a defocus amount or reliability of the defocus amount of the focusing point corresponding to the part is smaller than a predetermined value that is based on focusing states of a plurality of previously selected main focusing points; and
   the object included in the focusing point corresponding to the part is not the same as the object included in the previously selected main focusing point if either the defocus amount or the reliability of the defocus amount of the focusing point corresponding to the part is larger than the predetermined value.

3. The control apparatus according to claim 1, wherein the setting unit decides on an area including the part with the highest priority as the search area if the object included in the focusing point corresponding to the part is the same as the object included in the previously selected main focusing point.

4. The control apparatus according to claim 1, wherein in a case where the object included in the focusing point corresponding to the part is not the same as the object included in the previously selected main focusing point, the setting unit decides on as the search area:

an area including every detected part of the object if a body of the object is detected; and a predetermined area centered on an area including the part with the highest priority if the body of the object is not detected.

5. The control apparatus according to claim 1, wherein the priorities are set so that a pupil, a face, and a body are prioritized in this order.

6. An image capturing apparatus comprising:

an image sensor configured to convert an object image into an image signal; and the control apparatus according to claim 1.

7. A control method comprising:

setting a search area by using object information that includes information on a part of an object and is based on an image signal converted from an object image; and wherein the search area is set based on a determination, by using a focusing state of a focusing point corresponding to a part with a highest priority in priorities set for respective parts of the object by at least one of initial setting, user setting, or settings based on a posture of the object or an orientation of a camera system, whether or not the object included in the focusing point corresponding to the part is the same as an object included in a previously selected main focusing point, which is selected at a first timing, a main focusing point being a point on which focusing is performed; and selecting the main focusing point from a plurality of focusing points in the search area at a second timing after the first timing.

8. A non-transitory computer-readable storage medium storing a computer program that causes a computer to execute the control method according to claim 7.

* * * * *